July 10, 1962 E. W. SARD 3,043,513

MAGNETIC CORE SERIAL ADDER

Filed Nov. 3, 1959 2 Sheets-Sheet 1

INVENTOR,
EUGENE W. SARD.

BY Jack H. Linscott

ATTORNEY.

July 10, 1962 E. W. SARD 3,043,513
MAGNETIC CORE SERIAL ADDER
Filed Nov. 3, 1959 2 Sheets-Sheet 2
FIG. 3
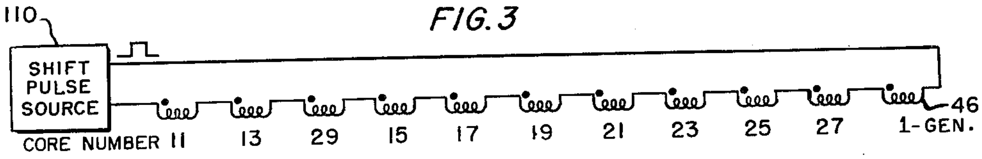
FIG. 4
| STATE OF CORE # / AFTER SHIFT PULSE # | 11 | 13 | 1-GEN 46 | 29 | 15 | 17 | 19 | 21 | 23 | 25 | 27 | Sn (OUTPUT) | |
|---|---|---|---|---|---|---|---|---|---|---|---|---|---|
| 0 | 0 | 0 | 1 | 0 | 0 | 1 | 0 | 0 | 0 | 0 | 0 | 0 | |
| 1 | 0 | 0 | 1 | 1 | 0 | 1 | 0 | 0 | 0 | 0 | 0 | 0 | |
| 2 | 0 | 1 | 1 | 1 | 0 | 1 | 1 | 0 | 0 | 0 | 0 | 0 | |
| 3 | 1 | 0 | 1 | 0 | 1 | 0 | 0 | 0 | 0 | 0 | 1 | 0 | |
| 4 | 0 | 0 | 1 | 1 | 1 | 0 | 0 | 0 | 0 | 1 | 0 | 0 | |
| 5 | 0 | 0 | 1 | 0 | 0 | 1 | 1 | 0 | 0 | 1 | 0 | 0 | |
| 6 | 0 | 0 | 1 | 0 | 0 | 1 | 0 | 0 | 1 | 0 | 1 | 0 | ADD |
| 7 | 0 | 0 | 1 | 0 | 0 | 1 | 0 | 0 | 1 | 0 | 0 | 1 | |
| 8 | 0 | 0 | 1 | 0 | 0 | 1 | 0 | 0 | 0 | 0 | 0 | 1 | |
| 9 | 0 | 0 | 1 | 0 | 0 | 1 | 0 | 0 | 0 | 0 | 0 | 0 | |
FIG. 5
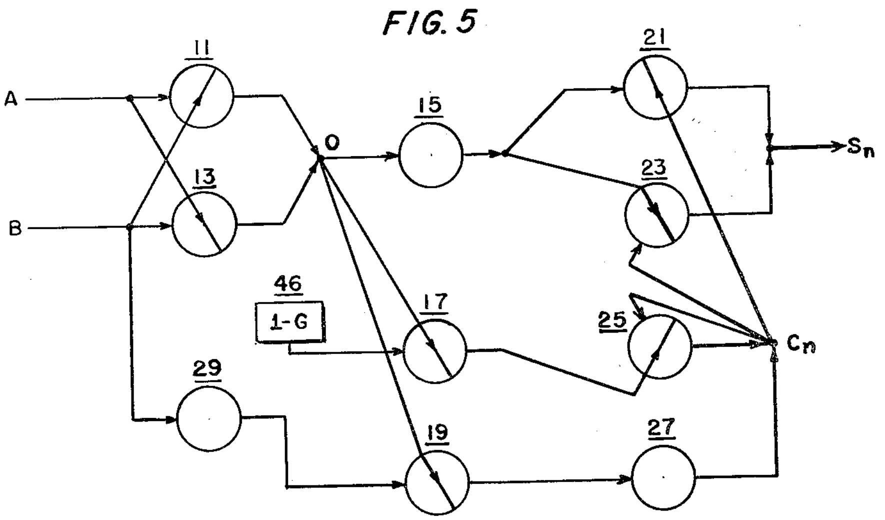
INVENTOR,
EUGENE W. SARD.
BY Jack H Linscott
ATTORNEY.

United States Patent Office 3,043,513

Patented July 10, 1962

3,043,513

MAGNETIC CORE SERIAL ADDER

Eugene W. Sard, Flushing, N.Y., assignor to the United States of America as represented by the Secretary of the Army Filed Nov. 3, 1959, Ser. No. 850,746
3 Claims. (Cl. 235—176)

This invention relates to magnetic core logic circuits and more particularly to serial adder circuits utilizing magnetic core logic circuits.

In serial adder circuits, two time-varying signals representing two binary numbers to be added are fed into the adder and the digits of the sum appear in time sequence as a time-varying output signal. Magnetic core type serial adder circuits are characterized by necessary delays between the input and output thereof which of course tends to slow down the operation. One such serial adder circuit is described in an article entitled "Circuits to Perform Logical and Control Functions with Magnetic Cores," published by Guterman, Kodis, and Ruhman in Part 4 of the IRE Convention Record 1954. It is a specific object of the present invention to provide a magnetic core serial adder wherein both the delay time and the number of cores are reduced.

It is another object of the invention to simplify the design of serial adders employing magnetic cores.

For a better understanding of the invention, together with other and further objects thereof, reference is had to the following description taken in connection with the accompanying drawing in which:

FIG. 3 illustrates the connection of the pulse shift windings associated with the magnetic cores;

FIG. 4 is a table illustrating the operational sequence of the magnetic cores; and FIG. 5 is a functional explanatory diagram of the serial adder.

Figure 1:
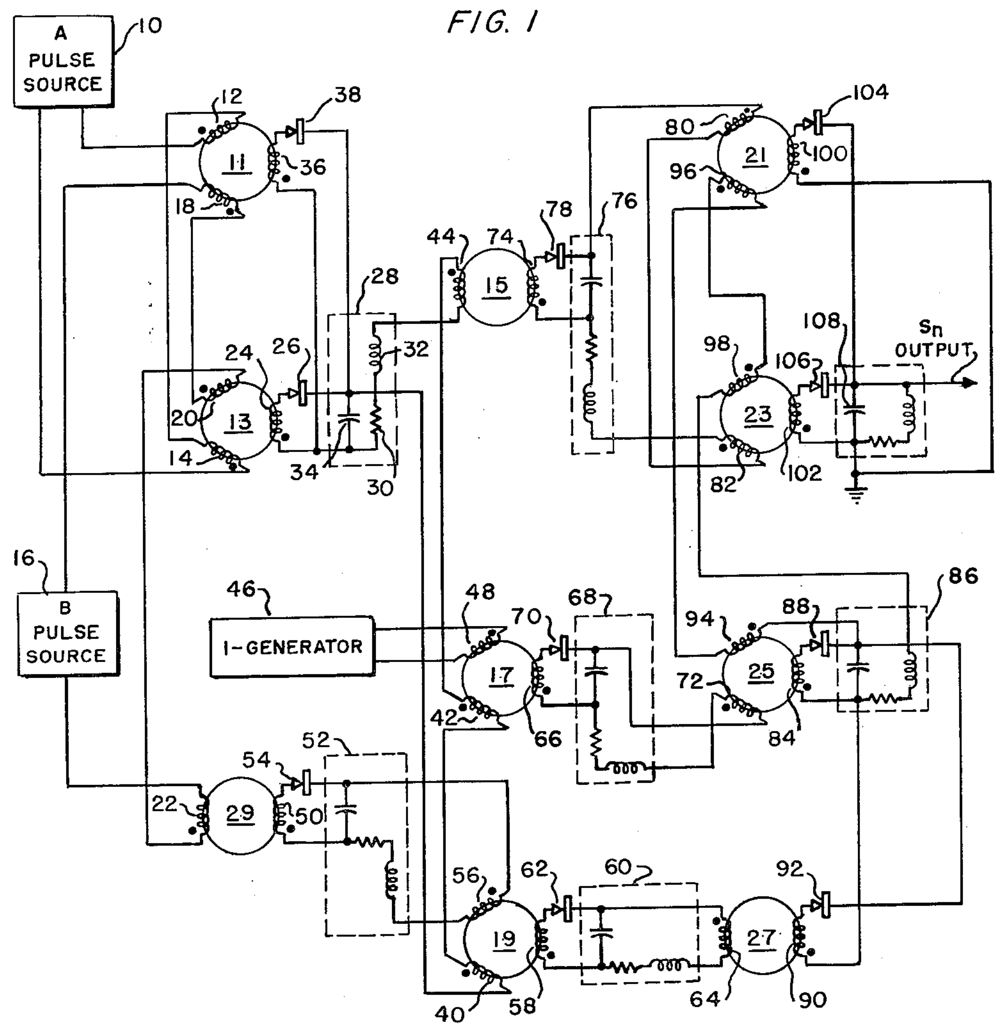
FIG. 1 is a schematic diagram of the magnetic core serial adder circuit.
Figure 2:
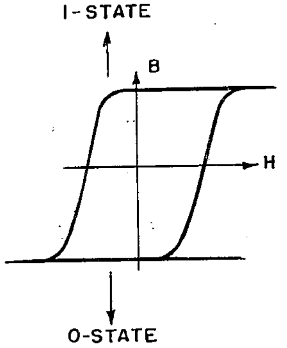
FIG. 2 is a graph illustrating the idealized rectangular hysteresis loop.

Referring now to FIG. 1, the serial adder circuit includes the cores 11, 13, 15, 17, 19, 21, 23, 25, 27 and 29. Each of these cores is fabricated from a magnetic material characterized by a substantially rectangular hysteresis loop as shown in FIG. 2. Each core is characterized by two directions or states of remanent magnetic induction referred to herein as the 0-state and the 1-state. One remanent condition corresponds to a flux substantially oriented in one direction and the other condition corresponds to flux substantially oriented in an opposite direction. The relative sense of linkage of a winding to a core is indicated in the drawing by a dot adjacent one of its terminals in accordance with the usual transformer convention. Current of increasing amplitude flowing into a dot marked terminal produces, or tends to produce, a change of flux to the 1-state in the linked core. Current of increasing amplitude flowing into an unmarked terminal produces, or tends to produce, a change of flux to the 0-state in the core. A change of flux in the core from the 1-state to the 0-state induces a voltage in each winding coupled thereto, the polarity of which is such that the marked terminal is negative relative to the unmarked terminal. For a flux change from the 0-state to the 1-state, the polarity of the induced voltage is reversed.

Referring again to FIG. 1, a first source of binary input signals 10, hereinafter designated as the A source, is connected in series to an input winding 12 linking core 11 and an inhibit winding 14 linking the core 13. Similarly, a second source of binary input signals 16, hereinafter designated as the B source, is connected in series to inhibit winding 18 linking core 11 and input windings 20 and 22 linking respective cores 13 and 29. An output winding 24 linking the core 13 is coupled through a diode 26 to a delay storage means 28. The diode 26 is poled to pass a positive current into the delay storage means 28. The delay storage means 28 includes a resistor 30 and an inductance 32 connected in series with output winding 24, and a capacitor 34 connected in shunt between the cathode of diode 26 and the junction of resistor 30 and output winding 24. An output winding 36 linking core 11 is also coupled to delay storage means 28 through a diode 38 which is poled to pass a positive current into the delay storage means 28. The arrangement of the windings on cores 11 and 13 provide an "exclusive OR" circuit for the inputs A and B. The output of delay storage means 28 is connected in series to inhibit windings 40 and 42 linking respective cores 19 and 17, and an input winding 44 linking core 15. A 1-generator circuit for generating a continuous series of 1's is shown at 46 and its output is coupled to an input winding 48 linking core 17.

As shown, an output winding 50 linking core 29 is connected to a delay storage means 52 through a diode 54 poled to pass a positive current into the delay storage means 52. Delay storage means 52 and each of the remaining delay storage means herein are identical in structure to the delay storage means 28. The output of delay storage means 52 is connected in series with an input winding 56 linking core 19. An output winding 58 linking core 19 is connected to a delay storage means 60 through a diode 62 poled to pass a positive current into delay storage means 60. The output of delay storage means 60 is connected across input winding 64 linking core 27. In a similar manner, an output winding 66 linking core 17 is connected to a delay storage means 68 through a diode 70 poled to pass a positive current into delay storage means 68. The output of delay storage means 68 is connected across an inhibit winding 72 linking core 25. An output winding 74 linking core 15 is connected to a delay storage means 76 through diode 78 poled to pass a positive current into delay storage means 76. The output of delay storage means 76 is connected in series to an input winding 80 linking core 21 and an inhibit winding 82 linking core 23.

An output winding 84 linking core 25 is connected to a delay storage means 86 through a diode 88 poled to pass a positive current into delay storage means 86. An output winding 90 linking core 27 is also connected to delay storage means 86 through a diode 92 poled to pass a positive current into delay storage means 86. The output of delay storage means 86 is connected in series to a feedback input winding 94 linking core 25, an inhibit winding 96 linking core 21 and an input winding 98 linking core 23. Output windings 100 and 102 linking cores 21 and 23, respectively, are each connected through respective diodes 104 and 106 to capacitor 108 across which the output of the circuit is derived. The diodes 104 and 106 are poled to pass a positive current into capacitor 108.

Each core is provided with a shift winding which is in series connection with a shift driving pulse source 110. These have not been shown in FIG. 1 in order to simplify the drawing. However, these shift windings are shown in FIG. 3 with the associated cores labeled above each winding. By this arrangement a shift pulse is applied to all the cores in series with a polarity such that the cores are driven or tend to be driven to the 0-state by the shift pulses. The shift pulse source 110 may include a known constant current source such as a pentode tube circuit. Other suitable sources may be employed if desired. Application of the shift pulse clears all the cores to the 0-state, thus generating a voltage in the output winding of any core which was previously in the 1-state.

The operation of the delay storage means hereinabove described is well known and is described in an article entitled "Magnetic Shift Register Using One Core Per Bit," published by Kodis, Ruhman, and Woo in Part 7 of the IRE Convention Record 1953. The operation of the 1-generator 46 is also well known. Its core will be set to the 1-state between successive shift pulses.

To adequately explain the operation of the serial adder, reference is made to the functional diagram shown in FIG. 5 as well as the circuitry shown in FIG. 1. The symbolic circuit arrangement shown in FIG. 5 is in accordance with that defined in the Guterman et al. publication hereinabove mentioned. It is to be noted that although the shift line is not shown in the functional diagram of FIG. 5, a common shift source is assumed. In FIG. 5, A and B are the two inputs, $C_n$ is the carry and $S_n$ is the sum. Assuming the least significant digit to be handled first, the truth table for each digit place ($n$) is as follows:

| $A_n$ | $B_n$ | $C_{n-1}$ | $S_n$ | $C_n$ |
|---|---|---|---|---|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

From the truth table, the following equations may be derived:

$$S_n=(A_n\bar{B}_n+B_n\bar{A}_n)\bar{C}_{n-1}+C_{n-1}\overline{(A_n\bar{B}_n+B_n\bar{A}_n)}$$

and $$C=B_n\overline{(A_n\bar{B}_n+B_n\bar{A}_n)}+C_{n-1}(A_n\bar{B}_n+B_n\bar{A}_n)$$

Now, let it be assumed that the output from source A is the binary number 1101 (decimal system No. 13) which is to be added to the output of source B which is assumed to be the binary number 1011 (decimal system No. 11). It is also to be assumed that the least significant digits are handled first, and that the binary inputs from source A and source B are applied between successive shift pulses. The correct timing of the input pulses can be insured by known synchronizing means connected between the shift pulse source and the input sources. In the discussion of the operation of the circuit, it is to be understood that the shift pulses will drive or tend to drive an associated core to the 0-state; that when a core is shifted from the 1-state to the 0-state, positive current is fed into its associated delay storage means; that an inhibit winding current prevents a change in flux in its associated core; and that for a core flux change from the 0-state to the 1-state, no output is developed across the associated delay storage means. Before the first shift pulse is applied, the output from 1-generator 46 is applied to the input winding 48 linking core 17 so that only core 17 of the serial adder is in the 1-state while the remaining cores are in the 0-state. This is shown in the first horizontal row in FIG. 4.

Upon the application of the first shift pulse, the flux change in core 17 from the 1-state to the 0-state induces a voltage in output winding 66 causing current to flow through the diode 70 thereby charging the capacitor of delay storage means 68. The output current of delay storage means 68 is applied to inhibit winding 72 linking core 25 so that core 25 is driven further into the 0-state. Assuming now the first least significant digits as being applied between the first and second shift pulses, the state of the cores after the first shift pulse are as shown in the second row of FIG. 4. Since both source A and source B provide 1's, cores 11 and 13 remain in the 0-state due to the inhibit windings 18 and 14. The 1-generator 46 of course is in the 1-state. Core 29 is driven to the 1-state by the output from source B and the flux change in core 29 induces voltage in output winding 50 which is blocked by the diode 54. Core 15 remains in the 0-state since there is no output from either core 11 or core 13. Core 17 is driven to the 1-state by the output of 1-generator 46 and the remaining cores remain in the 0-state.

Upon the application of the second shift pulse, outputs are derived from core 29 to set core 19 to the 1-state; an output is derived from core 17 which drives core 25 further into saturation in the 0-state; and the flux of the remaining cores are not affected. Assuming now that the next least significant digits are applied from source A and source B between the second and third shift pulses, the state of the cores after the second shift pulse will be as shown in the third row of FIG. 4. Since A provides a 0 and $B$ is 1, core 11 remains in the 0-state while cores 13 and 29 are driven to the 1-state and 1-generator 46 is also in the 1-state. Core 15 remains in the 0-state since there is no output from either core 11 or core 13. Core 17 is driven to the 1-state by the output of 1-generator 46. Core 19 remains in the 1-state and the remaining cores 21, 23, 25, and 27 remain in the 0-state.

Upon the application of the third shift pulse, cores 13, 29, 17, and 19 are driven to the 0-state so that the flux changes in these cores induce voltages in respective output windings 24, 50, 66, and 58 which causes current flow through respective diodes 26, 54, 70, and 62 to respective delay storage means 28, 52, 68, and 60. Assuming now that the third least significant digits 1 and 0 are applied from respective sources A and B while the capacitors of the delay storage means are discharging, the state of the cores after the third shift pulse will be as shown in row four of FIG. 4. Core 11 will be driven to the 1-state by the output from source A while core 13 will be further saturated in the 0-state. 1-generator 46 of course will be in the 1-state and core 29 will be further saturated in the 0-state. Since the output from core 13 is applied to the inhibit windings 42 and 40 of respective cores 17 and 19, cores 17 and 19 will remain saturated in the 0-state. Cores 21, 23, and 25 will also remain in the 0-state, while the output of core 19 is applied to input winding 64 linking core 27 to drive core 27 to the 1-state.

Upon the application of the fourth shift pulse, cores 11, 15, and 27 are driven to the 0-state so that the flux changes in these cores induce voltages in respective output windings 36, 74, and 90 which causes current to flow through respective diodes 38, 87, and 92 to respective delay storage means 28, 76, and 86. Assuming now that the fourth least significant digits $A=1$ and $B=1$ are applied while the capacitors of the delay storage means are discharging, the state of the cores after the fourth shift pulse will be as shown in the fifth row of FIG. 4. Cores 11 and 13 will remain in the 0-state due to the action of inhibit windings 18 and 14 linking cores 11 and 13; 1-generator 46 will be in the 1-state and core 29 will be driven to the 1-state by the output of source B. The output from core 11 will drive core 15 to the 1-state and will also be applied to inhibit windings 42 and 40 of respective cores 17 and 19 so that cores 17 and 19 will remain in the 0-state. The output from core 27 is applied as a feedback to core 25 to drive core 25 to the 1-state since no output is applied from core 17 to inhibit winding 72 linking core 25. The output from core 27 is also applied to the inhibit winding 96 linking core 21 so that core 21 is prevented from being driven to the 1-state and remains in the 0-state. In a similar manner, the output of core 15 is applied to the inhibit winding 82 of core 23 so that core 23 is prevented from being driven to the 1-state by the output from core 27 which is applied to input winding 98 of core 23. Thus core 23 is in the 0-state. Core 27 of course remains in the 0-state.

Upon the application of the fifth shift pulse, cores 29, 15, and 25 are driven from the 1-state to the 0-state so that the flux changes in these cores induce voltages in respective output windings 50, 74, and 84 which causes current to flow through respective diodes 54, 78, and 88 to respective delay storage means 52, 76, and 86. Thus after the fifth shift pulse, cores 11, 13, 29, and 15 are in the 0-state; core 17 is driven to the 1-state from the output of 1-generator 46 which is also in the 1-state; and core 19 is driven to the 1-state by the output of core 29. The output of core 25 is fed back to input winding 94 linking core 25 to drive core 25 to the 1-state. The output of core 25 is also applied to input winding 98 linking core 23 but this core is prevented from being driven to the 1-state by the output of core 15 which is applied to inhibit winding 82 linking core 23. Hence core 23 is maintained in the 0-state. The output of core 25 is also applied to the inhibit winding 96 linking core 21 thus preventing the output of core 15 which is applied to input winding 80 linking core 21 from driving core 21 to 1-state. Hence core 21 remains in the 0-state. The state of the cores after the fifth pulse is shown in row 6 of FIG. 4.

Upon application of the sixth shift pulse, cores 17, 19, and 25 are driven from the 1-state to the 0-state so that the flux changes in these cores induce voltages in respective output windings 66, 58, and 84 which causes current to flow through respective diodes 70, 62, and 88 to respective delay storage means 68, 60, and 86. Thus after the sixth shift pulse the output of 1-generator 46 drives core 17 to the 1-state; cores 11, 13, 15, and 29 remain saturated in the 0-state; core 19 is in the 0-state; core 27 is driven to the 1-state by the output of core 19; core 23 is driven to the 1-state by the feedback applied to winding 98 linking core 23 from the output of core 25; and core 25 is inhibited due to the output applied thereto from core 17 so that core 25 remains in the 0-state. The state of the cores after the sixth shift pulse is shown in the seventh row of FIG. 4.

Upon the application of the seventh shift pulse, cores 17, 23, and 27 are driven from the 1-state to the 0-state so that the flux changes in these cores induce voltages in respective output windings 66, 102, and 90 which causes current to flow through respective diodes 70, 106, and 92 to delay storage means 68, output capacitor 108, and delay storage means 86, respectively. Following the same sequence of events as hereinabove described, the state of the cores after the seventh shift pulse will be as shown in the eighth row of FIG. 4.

Upon the application of the eighth shift pulse, cores 17 and 23 are driven from the 1-state to the 0-state so that the flux changes in these cores induce voltage in respective output windings 66 and 102 which cause current to flow through respective diodes 70 and 106 to delay storage means 68 and capacitor 108. Again following the same sequence of events as hereinabove described, an output pulse is derived from core 23 and the cores are in the state as shown in the ninth row of FIG. 4. The ninth shift pulse will reset the cores to the state shown in the first row of FIG. 4. Since the circuit in FIG. 1 provides three pulse time delays between input and output, the output at $S_n$ in binary form will be 011000 which is equivalent to decimal system number 24. This is the sum of the two numbers applied in binary form from source A and source B.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A serial adder circuit comprising a first binary pulse source A and a second binary pulse source B, the respective outputs of said sources comprising the augend and addend input to said adder circuit, an exclusive OR circuit responsive to the outputs of said binary pulse sources A and B, a plurality of magnetic cores each having two directions of magnetization, a first 17, second 19, third 21, fourth 23, and fifth 25 of said cores being linked by a different one of a plurality of input windings, a different one of a plurality of output windings, and a different one of a plurality of inhibit windings, and a sixth 15, seventh 27, and eighth 29 of said cores being linked by respective input and output windings, the output of one of said sources being applied to the input winding linking said eighth core 29, means including a first delay storage means 28 connecting the output of said exclusive OR circuit simultaneously to an inhibit winding linking said first core 17, an inhibit winding linking said second core 19, and the input winding linking said sixth core 15, a 1-generator 46 having its output connected to the input winding of said first core 17, means including a second delay storage means 76 connecting the output winding of said sixth core 15 to the inhibit winding linking said fourth core 23 and the input winding linking said third core 21, means including a third delay storage means 68 connecting the output winding linking said first core 17 to the inhibit winding linking said fifth core 25, means including a fourth delay storage means 60 connecting the output winding linking said second core 19 to the input winding linking said seventh core 27, means including a fifth delay storage means 52 connecting the output winding linking said eighth core 29 to the input winding linking said second core 19, means including a sixth delay storage means 86 connected in common with the respective output windings linking said fifth core 25 and said seventh core 27, the output of said sixth delay storage means 86 being a carry output applied in series connection to the respective input windings linking said fifth core 25 and said fourth core 23 and the inhibit winding linking said third core 21, a shift pulse source 110, respective shift windings linking each of the eight cores and said 1-generator 46 in series connection with said pulse source, and means including a seventh delay storage means 108 connected in common with the respective output windings linking said third 21 and fourth 23 cores, the binary sum of said addend and augend beng derived at the output of said seventh delay storage means 108.

2. The serial adder in accordance with claim 1 wherein the respective delay storage means are connected to respective output windings through respective diodes poled to pass positive currents.

3. A serial adder circuit comprising a first pulse source A and a second pulse source B of binary pulses, the respective outputs of said sources comprising the augend and addend input to said adder circuit; a plurality of magnetic cores each having two directions of magnetizations; each of said cores being linked by a different one of a plurality of input windings and a different one of a plurality of output windings, each of said output windings have inserted therewith a respective diode poled to pass positive current such that there is an output from each core only when its respective diode passes positive current; the input winding of a first 11 and second 13 of said cores being responsive to the respective outputs of said A and B binary pulse sources, said first and second cores being linked by respective inhibit windings responsive to the outputs of said B and A binary pulse sources, respectively, the respective outputs of said first 11 and said second 13 cores being connected in common to a first delay storage means 28; a third 29 of said cores having its input winding responsive to the output of said B binary pulse source; a fourth 17, fifth 19, sixth 21, seventh 23, and eighth 25, of said cores being linked by respective inhibit windings; the output of said first delay storage means 28 being simultaneously applied to the inhibit windings linking said fourth 17 and fifth 19 cores and to the input winding linking a ninth core 15; a second delay storage means 76 connecting the output of said ninth core 15 to the input winding of said sixth core 21 and the inhibit winding linking said seventh core 23; a third delay storage means 68 connecting the output of said fourth core 17 to the inhibit winding linking said eighth core 25; a fourth delay storage means 86 connecting the output of said eighth core 25 to the inhibit winding linking said sixth core 21, the input winding linking said seventh core 23 and the input winding linking said eighth core 25, the output of said fourth delay storage means 86 being applied as a carry output; a fifth delay storage means 52 connecting the output of said third core 29 to the input winding of said fifth core 19; a sixth delay storage means 60 connecting the output of said fifth core 19 to the input winding linking a tenth 27 of said cores; the output of said tenth core 27 being connected to the input of said fourth delay storage means 86; a 1-generator 46 having its output connected to the input winding of said fourth core 17; a source of shift pulses 110; respective shift windings linking each of said cores and said 1-generator 46 and in series connection with said shift pulse source 110; and seventh delay storage means 108 in common connection with the outputs of said sixth 21 and said seventh 23 cores, the primary sum of said addend and augend being derived at the output of said seventh delay storage means 108.

References Cited in the file of this patent

Guterman et al.: Circuits to Perform Logical and Control Functions with Magnetic Cores, National I.R.E. Convention Record, Part IV (March 1954), pp. 124 to 132.

Guterman et al.: Logical and Control Functions Performed with Magnetic Cores, Proceedings of the I.R.E. (March 1955), pp. 291 to 298.